United States Patent
Shanley et al.

(10) Patent No.: US 11,568,504 B2
(45) Date of Patent: *Jan. 31, 2023

(54) METHODS AND SYSTEMS FOR IDENTIFYING MUSICAL COMPOSITIONS IN A SOUND RECORDING AND LICENSING THE SAME

(71) Applicant: MUSIC REPORTS, INC., Woodland Hills, CA (US)

(72) Inventors: Michael Shanley, Los Angeles, CA (US); Richard Revilla, Woodland Hills, CA (US); Roger Ging, Camarillo, CA (US); Ronald H. Gertz, Woodland Hills, CA (US); Miller L. Watkins, III, Los Angeles, CA (US); William B. Colitre, II, Topanga, CA (US)

(73) Assignee: MUSIC REPORTS, INC., Woodland Hills, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/212,652

(22) Filed: Mar. 25, 2021

(65) Prior Publication Data

US 2022/0044340 A1     Feb. 10, 2022

Related U.S. Application Data

(63) Continuation of application No. 16/996,829, filed on Aug. 18, 2020, now abandoned, which is a
(Continued)

(51) Int. Cl.
*G06Q 50/18* (2012.01)
*G06F 16/68* (2019.01)
(Continued)

(52) U.S. Cl.
CPC ......... *G06Q 50/184* (2013.01); *G06F 16/686* (2019.01); *G06Q 30/0185* (2013.01); *G06Q 40/02* (2013.01); *G06Q 40/12* (2013.12)

(58) Field of Classification Search
CPC .. G06Q 50/184; G06Q 30/0185; G06Q 40/02; G06Q 40/12; G06F 16/686
See application file for complete search history.

(56) References Cited

U.S. PATENT DOCUMENTS

| 4,924,378 A | 5/1990 | Hershey et al. |
| 6,385,596 B1 * | 5/2002 | Wiser ................. H04L 9/3271 369/84 |

(Continued)

FOREIGN PATENT DOCUMENTS

| WO | 2000042555 A1 | 7/2000 | |
| WO | WO-2005124642 A1 * | 12/2005 | ............. G06Q 30/06 |

OTHER PUBLICATIONS

Jane Kaufman Winn & James R. Wrathall, Who Owns the Customer—The Emerging Law of Commercial Transactions in Electronic Customer Data, 56 Bus. Law. 213 (2000). (Year: 2000).*

(Continued)

*Primary Examiner* — Ashford S Hayles
(74) *Attorney, Agent, or Firm* — Perkins Coie LLP

(57) ABSTRACT

Disclosed herein is a musical works administration service to digital music service providers (DSPs), to provide a streamlined approach for such DSPs to comply with copyright licensing, accounting, and reporting requirements. The service receives, from the DSP, information relating to sound recordings used by the DSP during a relevant time period. Using several matching techniques, the service identifies specific musical compositions embodied in each sound recording, and also determines corresponding publisher-share information. Subsequently, the service employs several mechanisms to attempt to obtain licenses for publisher-
(Continued)

shares that are not already covered by preexisting client licenses. Based on the client's usage of such sound recordings and other related information, the service also performs accounting, reporting, and payment operations for the client. The service, in some instances, receives funds from the client and makes corresponding royalty payments (and makes accounting reports available) to the respective rights holders.

1 Claim, 16 Drawing Sheets

Related U.S. Application Data continuation of application No. 16/220,602, filed on Dec. 14, 2018, now abandoned, which is a continuation of application No. 15/060,480, filed on Mar. 3, 2016, now Pat. No. 10,157,434, which is a continuation of application No. 12/764,897, filed on Apr. 21, 2010, now abandoned.

(60) Provisional application No. 61/171,302, filed on Apr. 21, 2009.

(51) Int. Cl.
  *G06Q 40/02* (2012.01)
  *G06Q 40/00* (2012.01)
  *G06Q 30/00* (2012.01)

(56) References Cited

U.S. PATENT DOCUMENTS

| | | | | |
|---|---|---|---|---|
| 7,047,241 | B1* | 5/2006 | Erickson | G06F 21/10 380/278 |
| 8,117,094 | B2* | 2/2012 | Multerer | G06Q 40/12 705/28 |
| 10,157,434 | B2 | 12/2018 | Shanley et al. | |
| 2002/0107803 | A1* | 8/2002 | Lisanke | H04L 63/0428 705/51 |
| 2002/0173976 | A1* | 11/2002 | Martin | G06Q 50/18 726/28 |
| 2003/0135464 | A1* | 7/2003 | Mourad | G06F 16/958 707/E17.116 |
| 2004/0024688 | A1* | 2/2004 | Bi | G06F 21/105 705/37 |
| 2004/0093262 | A1* | 5/2004 | Weston | G06Q 30/0205 705/7.29 |
| 2005/0119979 | A1* | 6/2005 | Murashita | G06K 7/0004 705/67 |
| 2005/0211770 | A1* | 9/2005 | Iida | G06F 16/68 235/382 |
| 2005/0289065 | A1* | 12/2005 | Weare | G10L 19/018 704/E19.009 |
| 2007/0180468 | A1* | 8/2007 | Gill | G06F 21/10 348/E7.071 |
| 2008/0147558 | A1* | 6/2008 | Kraus | G06F 21/10 713/150 |
| 2008/0301058 | A1* | 12/2008 | Campbell | G06Q 30/06 707/999.102 |
| 2011/0099096 | A1 | 4/2011 | Shanley et al. | |
| 2011/0106673 | A1 | 5/2011 | Shanley et al. | |
| 2012/0240140 | A1* | 9/2012 | Nathan | H04N 7/17318 725/5 |
| 2013/0086014 | A1* | 4/2013 | Bingham | G06F 16/958 707/E17.014 |

OTHER PUBLICATIONS

Castle, C.; Mitchell, A. E. ISP Music Licensing. Licensing Journal, [s. l.], v. 28, n. 6, p. 14-19, 2008. Disponível em: https://search.ebscohost.com/login.aspx?direct=true&db=bth&AN=32816541&site=ehost-live&scope=site. Acesso em: Jun. 8, 2022. (Year: 2008).*
McLennan, S. (Mar. 12, 2002). Stream music is RIAA's target; if rules are adopted, listeners to be charged a per-song fee: [ALL edition]. Telegram & Gazette Retrieved from https://www.proquest.com/newspapers/stream-music-is-riaas-target-if-rules-are-adopted/docview/268828268/se-2 (Year: 2002).*
U.S. Appl. No. 61/170,549, filed Apr. 17, 2009, Unpublished Provisional Application.
U.S. Appl. No. 61/171,302, filed Apr. 21, 2009, Unpublished Provisional Application.
37 CFR 201.18, As published Jun. 22, 2004, p. 34582, vol. 69, No. 119, Federal Register.
Mitchell et al., "ISP Music Licensing," The Licensing Journal. 2008; 28(6) 14-. Print.
Schwab, "Consent to Receive Paperless Documents," Internet Archive Wayback Machine, Apr. 2007.
O'Conner, "Normalization," Canonical Decomposition. Feb. 2007.
"Update on Major Metadata Standards," Library Technology Reports. 2005; 41(6: 20-. Print.
USPTO, Final Office Action for U.S. Appl. No. 12/764,897, dated Oct. 15, 2012.
USPTO, Final Office Action for U.S. Appl. No. 12/764,897, dated Sep. 3, 2015.
USPTO, Non-Final Office Action for U.S. Appl. No. 12/764,897, dated Dec. 6, 2013.
USPTO, Non-Final Office Action for U.S. Appl. No. 12/764,897, dated Nov. 22, 2011.
USPTO, Non-Final Office Action for U.S. Appl. No. 12/764,897, dated Sep. 29, 2014.
USPTO, Final Office Action for U.S. Appl. No. 12/764,901, dated Oct. 15, 2012.
USPTO, Final Office Action for U.S. Appl. No. 12/764,901, dated Sep. 2, 2015.
USPTO, Non-Final Office Action for U.S. Appl. No. 12/764,901, dated Nov. 21, 2013.
USPTO, Non-Final Office Action for U.S. Appl. No. 12/764,901, dated Nov. 22, 2011.
USPTO, Non-Final Office Action for U.S. Appl. No. 12/764,901, dated Sep. 11, 2014.
USPTO, Notice of Allowance for U.S. Appl. No. 15/060,480, dated Nov. 1, 2018.
USPTO, Non-Final Office Action for U.S. Appl. No. 16/996,829, dated Jun. 24, 2021.
Vassiliadis et al., "IPR Protection for Digital Media Distribution: Trends and Solutions in the E-Business Domain," International Journal of E-Business Research. 2007; 3(4), pp. 79-97.

* cited by examiner

METHODS AND SYSTEMS FOR IDENTIFYING MUSICAL COMPOSITIONS IN A SOUND RECORDING AND LICENSING THE SAME

PRIORITY CLAIM AND CROSS-REFERENCE TO RELATED APPLICATIONS

This application is a continuation of U.S. application Ser. No. 16/996,829, filed Aug. 18, 2020, which is a continuation of U.S. application Ser. No. 16/220,602, filed Dec. 14, 2018, which is a continuation of U.S. application Ser. No. 15/060,480, filed Mar. 3, 2016, and now U.S. Pat. No. 10,157,434, which is a continuation of U.S. application Ser. No. 12/764,897, filed Apr. 21, 2010 and now abandoned, which claims priority to U.S. Provisional Patent Application No. 61/171,302, entitled ACCOUNTING, PAYMENT, AND REPORTING SYSTEMS AND PROCESSES, filed Apr. 21, 2009, all of which are hereby incorporated by reference in their entirety.

This application hereby incorporates by reference in its entirety U.S. patent application Ser. No. 12/764,901, filed Apr. 21, 2010, entitled METHODS AND SYSTEMS FOR LICENSING SOUND RECORDINGS USED BY DIGITAL MUSIC SERVICE PROVIDERS.

FIELD

The techniques described in this application generally relate to the field of identifying musical compositions in sound recordings and licensing such compositions on behalf of online music stores.

BACKGROUND

Before the advent of the Internet and the popularity of "online music," users traditionally purchased music through physical media (e.g., tape records, audio CDs, etc.). However, more recently, with the advancements in Internet technology and availability of high-quality music renderings over the Internet, consumers prefer to obtain music directly from digital music service providers "DSPs" (e.g., Apple iTunes®, lala media, inc., Slacker®, Zune®, etc.). Some DSPs offer users the ability to download a copy of the actual music file on a permanent or "limited download" basis, while other music stores stream the music (without actually providing a file for downloading) for the user to listen to. The users typically pay such DSPs on a per-song or a per-period subscription basis, while some DSPs operate on an advertising-supported model.

The DSPs do not typically hold a "copyright interest" in the sound recordings ("recordings" or "tracks") that they make available to their consumers, or in the musical compositions ("compositions" or "songs") that may be embodied in those sound recordings. Instead, the DSPs must obtain copyright licenses to use (e.g., by reproducing and distributing) a particular sound recording and any musical composition(s) embodied in such sound recording, and, in exchange, compensate (e.g., in terms of royalty payments) one or more entities that hold a copyright interest in the particular sound recording and the underlying composition(s).

Music licensing in the United States is based on the protection that U.S. copyright law provides for such rights holders. The Copyright Act of the United States (title 17 of the U.S. Code) provides for copyright protection in "sound recordings." The U.S. copyright office defines "sound recordings" as "works that result from the fixation of a series of musical, spoken, or other sounds, but not including the sounds accompanying a motion picture or other audiovisual work." So, a "sound recording" is just that—a recording of sounds. Common examples include recordings of music, drama, or lectures. Sound recordings are typically owned and licensed by record companies or "labels". A given sound recording may embody one or more compositions, or "musical works" (i.e., the notes and lyrics), which compositions have copyright protection under the Copyright Act that is separate from the copyright in any sound recording which may embody that composition. Each such composition may have one or more copyright owners or co-owners, which are typically music publishers, or simply "publishers". Accordingly, a sound recording may include multiple "publisher-shares," representing entities that have a copyright interest in at least a portion of at least one musical composition embodied in a given sound recording. In some instances, a "publishing administrator" works on behalf of such entities, which may include, for example, a music publisher, the composer(s) (i.e., the person(s) who wrote the music of the composition), the author(s) (i.e., the person(s) who wrote the lyrics), etc. In a typical example, the composer and the author share co-ownership of the actual copyright to the musical composition with the publisher, who represents the composition in business dealings.

In order to comply with the Copyright Act, a DSP would have to identify each rights holder associated with nearly every sound recording ever used, reproduced, or distributed by the DSP, and attempt to obtain licenses from (and make corresponding royalty payments to) such rights holders. Because record companies (as the typical owners of sound recordings) represent a limited group of concentrated copyright ownership and typically control 100% of the copyright in any given recording, DSPs are usually able to efficiently license from and account to record companies without assistance from third parties. In contrast, the ownership of musical compositions tends to be far less concentrated, and split ownership of individual songs is commonplace. As a result, DSPs often turn to third party service providers to obtain licenses from, and account to the various owners of those compositions.

Overall, the examples herein of some prior or related systems and their associated limitations are intended to be illustrative and not exclusive. Other limitations of existing or prior systems will become apparent to those of skill in the art upon reading the following detailed description.

SUMMARY OF THE DESCRIPTION

At least one embodiment of the present invention discusses a technique for providing a "musical works administration service" to a DSP (a "client"), to enable the client to comply with various copyright requirements in connection with the use or distribution of licensed sound recordings. In one embodiment, the service receives client label metadata ("CLM") from a client, wherein the CLM consists of identifying a sound recording. The service then performs a processing routine to integrate the received CLM into a normalized CLM database. Subsequent to integrating the CLM data, the service performs a matching operation to identify publishing rights-holder information associated with the sound recording identified by the received CLM and to enter the CLM as a "matched sound recording" entry in a pivot table. The service then performs a licensing operation to evaluate the extent to which the musical composition embodied in a matched sound recording is already licensed and to acquire new licenses for any remaining unlicensed publishing shares of such matched sound recording. In addition to the CLM data, the service receives other data for a relevant accounting period from the client, such as information about the number of uses of the sound recording during the period and the resulting revenue, and associates that information with the publishing information about the sound recording. The service then performs an accounting operation for the relevant accounting period to determine a royalty rate associated with the reported usage of the sound recording. The service then performs a reporting function to report license status to the client and to request royalty funds from the client for use of the matched sound recording during the applicable accounting period. Finally, the service performs a reporting operation to provide royalty statements to, and a payment operation to compensate, the relevant publishing rights-holders based on the client's use of the sound recording.

Other advantages and features will become apparent from the following description and claims. It should be understood that the description and specific examples are intended for purposes of illustration only and not intended to limit the scope of the present disclosure.

BRIEF DESCRIPTION OF DRAWINGS

These and other objects, features and characteristics of the present invention will become more apparent to those skilled in the art from a study of the following detailed description in conjunction with the appended claims and drawings, all of which form a part of this specification. In the drawings:

Figure 1A:
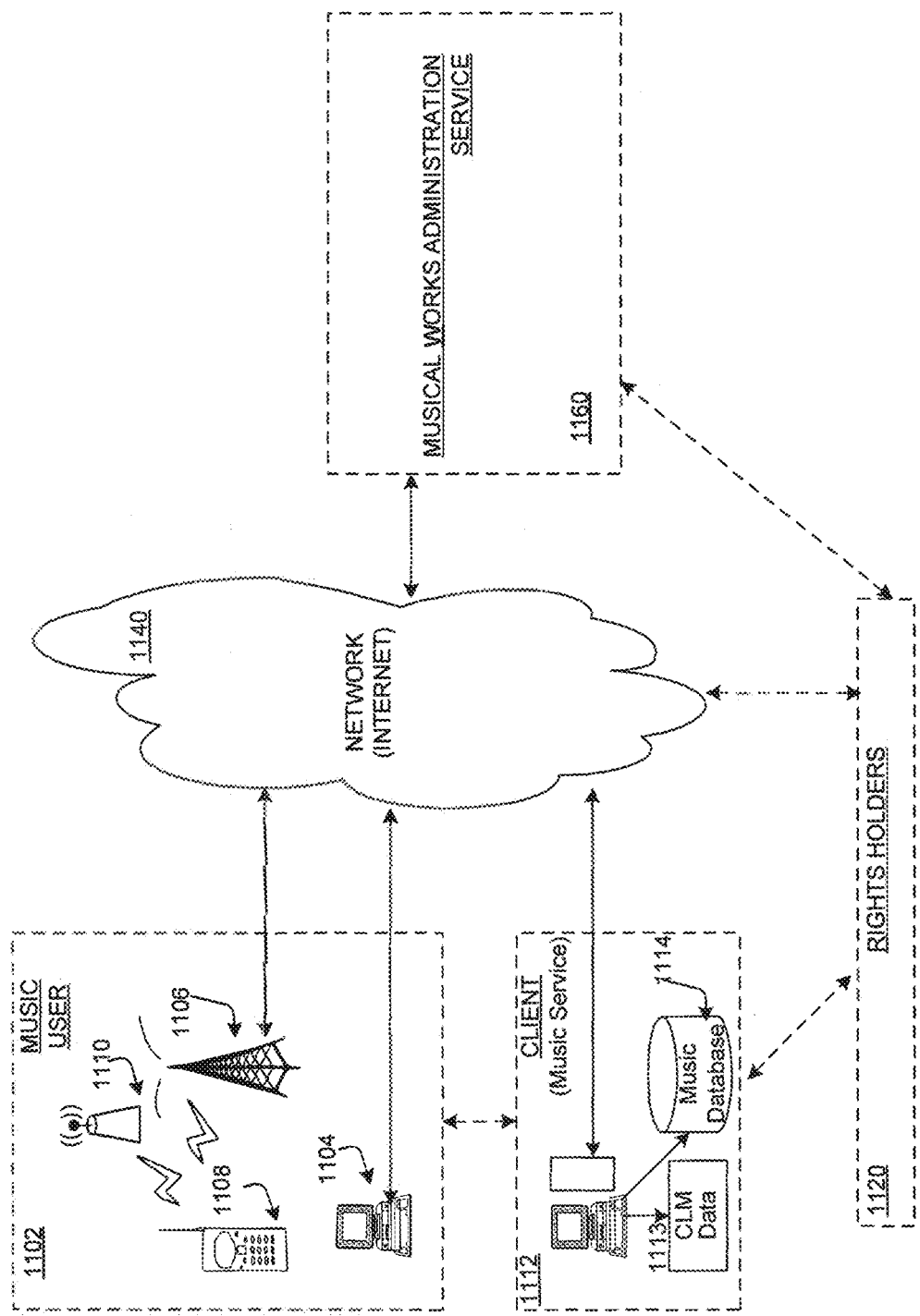
FIG. 1A provides a brief, general description of a representative environment in which the invention can be implemented.

The headings provided herein are for convenience only and do not necessarily affect the scope or meaning of the claimed invention.

In the drawings, the same reference numbers and any acronyms identify elements or acts with the same or similar structure or functionality for ease of understanding and convenience. To easily identify the discussion of any particular element or act, the most significant digit or digits in a reference number refer to the Figure number in which that element is first introduced (e.g., element 204 is first introduced and discussed with respect to FIG. 2).

DETAILED DESCRIPTION

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention can include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

FIG. 1 and the following discussion provide a brief, general description of a representative environment in which the invention can be implemented. Although not required, aspects of the invention may be described below in the general context of computer-executable instructions, such as routines executed by a general-purpose data processing device (e.g., a server computer or a personal computer). Those skilled in the relevant art will appreciate that the invention can be practiced with other communications, data processing, or computer system configurations, including: wireless devices, Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers, and the like. Indeed, the terms "computer," "server," and the like are used interchangeably herein, and may refer to any of the above devices and systems.

While aspects of the invention, such as certain functions, are described as being performed exclusively on a single device, the invention can also be practiced in distributed environments where functions or modules are shared among disparate processing devices. The disparate processing devices are linked through a communications network, such as a Local Area Network (LAN), Wide Area Network (WAN), or the Internet. In a distributed computing environment, program modules may be located in both local and remote memory storage devices.

Aspects of the invention may be stored or distributed on tangible computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data related to the invention may be distributed over the Internet or over other networks (including wireless networks), on a propagated signal on a propagation medium (e.g., an electromagnetic wave(s), a sound wave, etc.) over a period of time. In some implementations, the data may be provided on any analog or digital network (packet switched, circuit switched, or other scheme).

As shown in FIG. 1, a user may use a personal computing device (e.g., a phone 1108, a personal computer 1104, etc.) to communicate with a network 1140. The term "phone," as used herein, may be a cell phone, a personal digital assistant (PDA), a portable email device (e.g., a Blackberry®), a portable media player (e.g., an IPod Touch®), or any other device having communication capability to connect to the network. In one example, the phone 1108 connects using one or more cellular transceivers or base station antennas 1106 (in cellular implementations), access points, terminal adapters, routers or modems 1110 (in IP-based telecommunications implementations), or combinations of the foregoing (in converged network embodiments).

In some instances, the network 1140 is the Internet, allowing the phone 1108 (with, for example, WiFi capability) or the personal computer 1104 to access and retrieve multimedia data (e.g., digital streaming music, digital streaming videos, etc.) from music service providers (e.g., client 1112). In some instances, especially where the phone 1108 is used to access web content through the network 1140 (e.g., when a 3G or an LTE service of the phone 102 is used to connect to the network 1140), the network 1140 may be any type of cellular, IP-based or converged telecommunications network, including but not limited to Global System for Mobile Communications (GSM), Time Division Multiple Access (TDMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), Worldwide Interoperability for Microwave Access (WiMAX), Universal Mobile Telecommunications System (UMTS), Evolution-Data Optimized (EVDO), Long Term Evolution (LTE), Ultra Mobile Broadband (UMB), Voice over Internet Protocol (VoIP), Unlicensed Mobile Access (UMA), etc.

Other advantages and features will become apparent from the following description and claims. It should be understood that the description and specific examples are intended for purposes of illustration only and not intended to limit the scope of the present disclosure.

A user 1102 uses one of the personal computing devices (e.g., the phone 1108, the personal computer 1104, etc.) to access digital content (e.g., online streaming music) offered by the client 1112. In one example, the client 1112 is a digital music service provider that allows the user 1102 to select and play (and/or download) sound recordings (or tracks) offered by the client 1112.

In one embodiment, the client 1112 maintains a database of information about the sound recordings in its catalog in the form of client label metadata (CLM) 1113. The tracks or sound recordings comprised in the client's music database 1114 (as identified, for example, through the CLM 1113) may be used or played by the client's users (e.g., music user 1102). As will be explained in detail with reference to FIG. 2B, each record in the CLM 1113 includes "identifier" information that may be useful for uniquely identifying a particular sound recording.

In an exemplary illustration, the music user 1102 utilizes an online interface (e.g., a website through which the user can select a particular sound recording for online streaming or downloading) operated by the client 1112. The client 1112 uses the interface to provide access to the sound recordings stored in the client's music data base 1114. In response to gaining access to the sound recordings, the music user 1102 may provide monetary compensation to the client 1114. The monetary compensation may be in one of several manners, as can be appreciated by a person of ordinary skill in the art. For example, the client 1112 may charge the music user 1102 a specific amount for every download or online-streaming request of each sound recording requested by the music user 1102. In other examples, the client 1112 may collect a subscription fee for the music user's unlimited access to the sound recordings for a specific period of time (e.g., weekly, monthly, yearly, etc.).

In most instances, as explained above, the client 1112 may not have a direct copyright ownership or interest in the sound recordings comprised (and offered to the music users 1102) in its music database 1114. Instead, such ownership interests are vested in one or more rights holders 1120. Examples of such rights holders 1120 include: (i) record companies, who typically own or control the copyrights in the sound recordings themselves; and (ii) music publishers, who typically own or control the copyrights in the musical compositions which may be embodied in those sound recordings. Other rights holders may include publishing catalog administrators, care/of entities or payee designees (as designated by, for example, the publishers and/or composers of the applicable musical composition, authors, composers, etc. As necessitated by Copyright Law provisions, the client 1112 is typically obligated to obtain licenses, for the use and distribution of the sound recordings and any musical compositions embodied in such sound recordings. For example, for the use or distribution of a given sound recording embodying a musical composition that comprises four publisher-shares, the client 1112 may be obligated to obtain (or identify a previously existing) license for each publisher-share and subsequently provide accounting and make royalty payments for each publisher-share.

A music works administration service 1160, offered by an administration server 1164, enables the client 1112 to adhere to such obligations. In one embodiment, the client 1112 transmits one or more CLM files to the administration server 1164 over the network 1140. The administration server 1164, as will be discussed in detail below, provides the musical works administration service 1160, which allows the client 1112 to, for example, obtain appropriate licenses, and to provide reporting and royalty payment to the rights holders 1120.

Figure 1B:
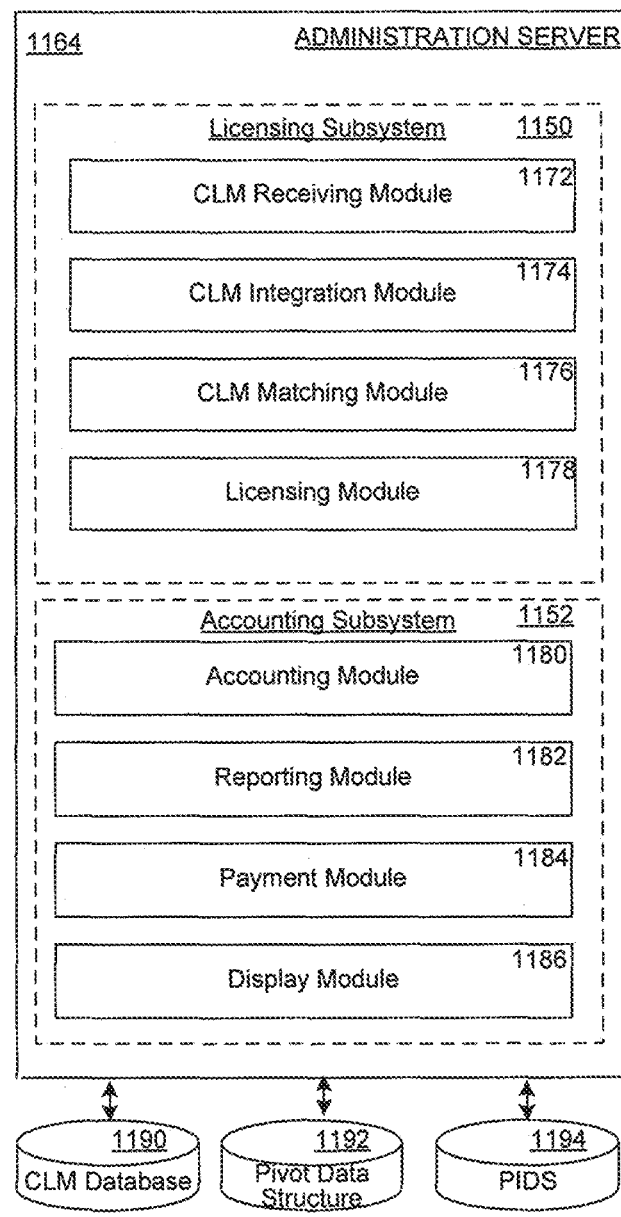
FIG. 1B is a block diagram illustrating an exemplary architecture of an administration server configured to perform the various functionalities of the musical works administration service.

FIG. 1B is a block diagram depicting an exemplary architecture of the administration server 1164, configured to provide the various functionalities of the musical works administration service 1160. In the illustrated embodiment, the administration server 1164 broadly includes a licensing subsystem 1150 and an accounting subsystem 1152. The licensing subsystem 1150 includes a receiving module 1172, a CLM integration module 1174, a CLM matching module 1176, and a licensing module 1178. The accounting subsystem 1152 includes an accounting module 1180, a reporting module 1182, a payment module 1184, and a display module 1186. In some embodiments, these subsystems and modules are implemented using programmable circuitry programmed by software and/or firmware, or using special-purpose hardwired circuitry, or using a combination of such embodiments. In some instances, the subsystems are implemented as units in a processor of the administration server 1164.

CLM Reception and Integration

Figure 2A:
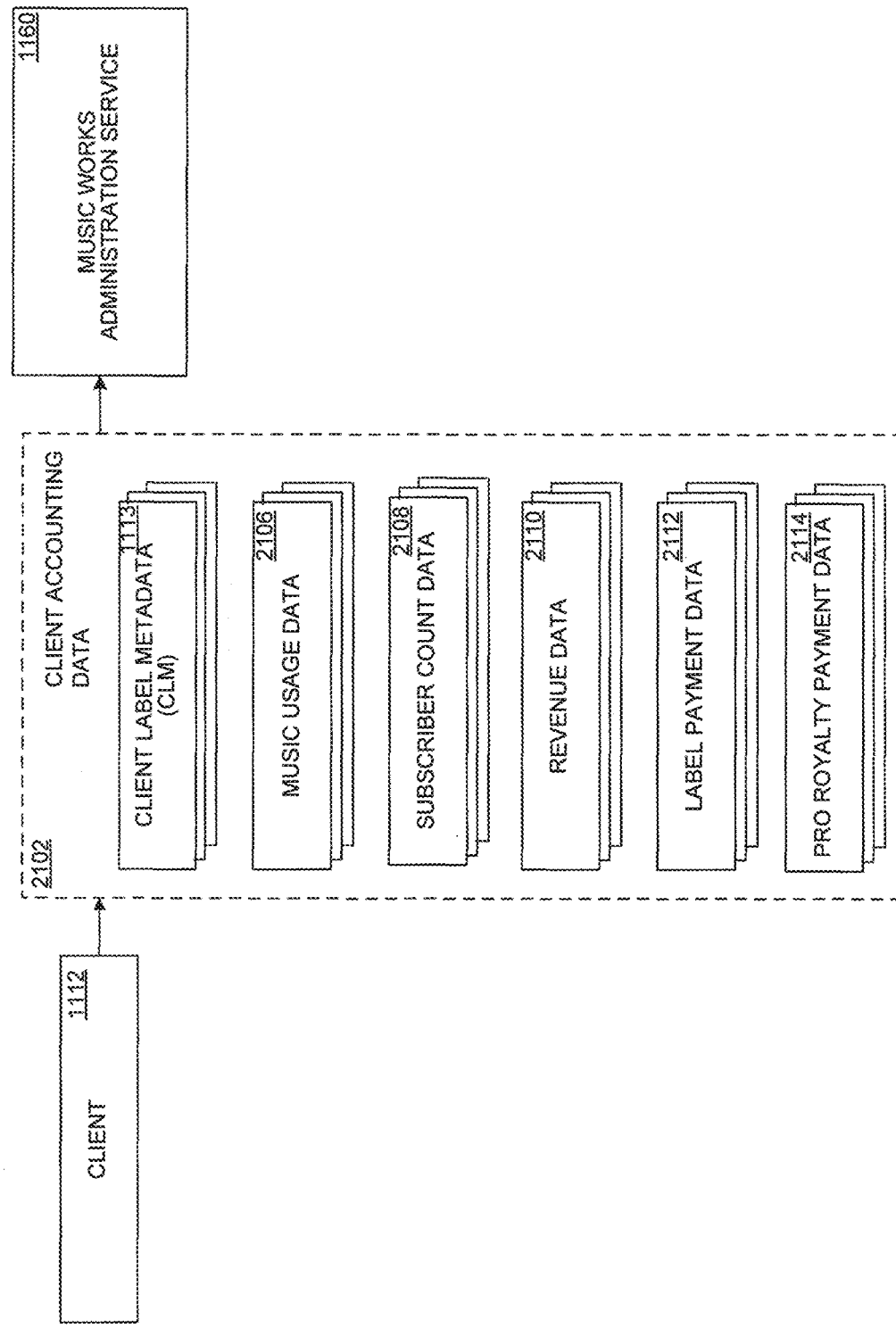
FIG. 2A illustrates various types of client accounting data transmitted by the client to the administration server.
Figure 2B:
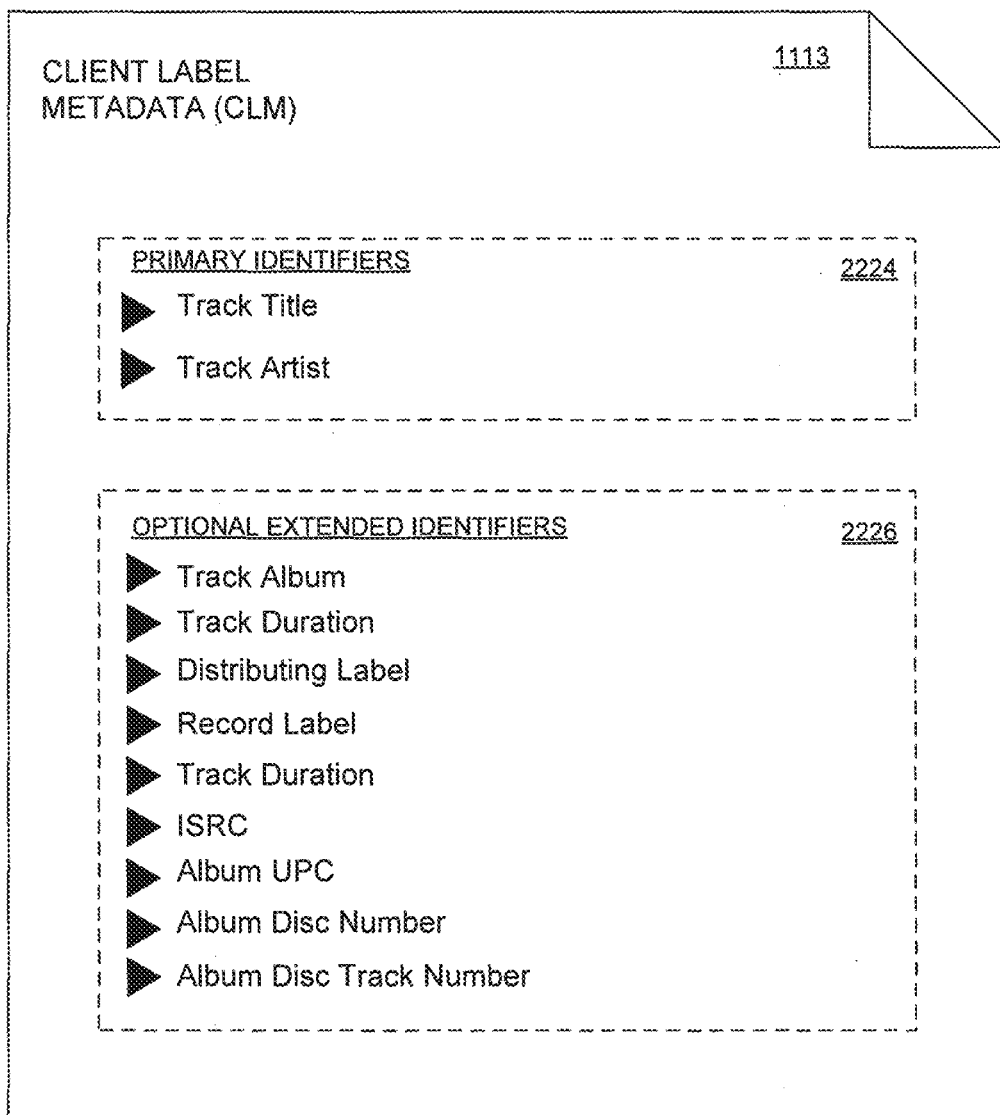
FIG. 2B depicts an exemplary list of primary and optional extended identifiers included in the CLM transmitted by the client.

The receiving module 1172 is configured to receive, from the client 1112, CLM data and other client accounting data 2102 (as illustrated in FIG. 2A). The receiving module 1172 receives the CLM data 1113 in various data formats (e.g., txt files, cvs files, xls files, etc.) from the client 1112 in an on-demand or on a scheduled basis. In some instances, in provisioning the transfer schedule (of the CLM data 1113 from the client 1112), the time required for licensing, matching, royalty reporting, payments, and other accounting processes are taken into consideration to guide scheduling. The CLM data files 1113 may be received over the network 1140 via, for example, FTP or SFTP protocols.

In some embodiments, the receiving module 1172 receives other types of client accounting data 2102 in addition to the CLM data, as is illustrated in FIG. 2A. The additional information is used by the various components of the administration server 1164 for providing services such as licensing, royalty accounting, payment, etc. As shown in the example of FIG. 2A, such client accounting data 2102 includes, for example, CLM data 1113, music usage data 2106 relating to usage statistics of particular sound recordings, subscriber count data 2108, revenue data 2110, label payment data 2112, and Performing Rights Organization ("PRO") royalty payment data 2114.

The CLM data 1113, as briefly discussed above, includes several identifiers relating to a particular sound recording. An exemplary illustration of such identifiers is provided in FIG. 2B. In some instances, the CLM data 1113 comprises two types of identifiers: primary identifiers 2224 and extended identifiers 2226. The primary identifiers 2224 may include track title and track artist information. The extended identifiers 2226 are optionally included in the CLM data, and may include such identifiers as track album information, track duration, name of the distributing label, name of the record label, duration of the track, the ISRC of the track, album UPC, disc number within the album, track number within the album disc, etc.

Figure 2C:
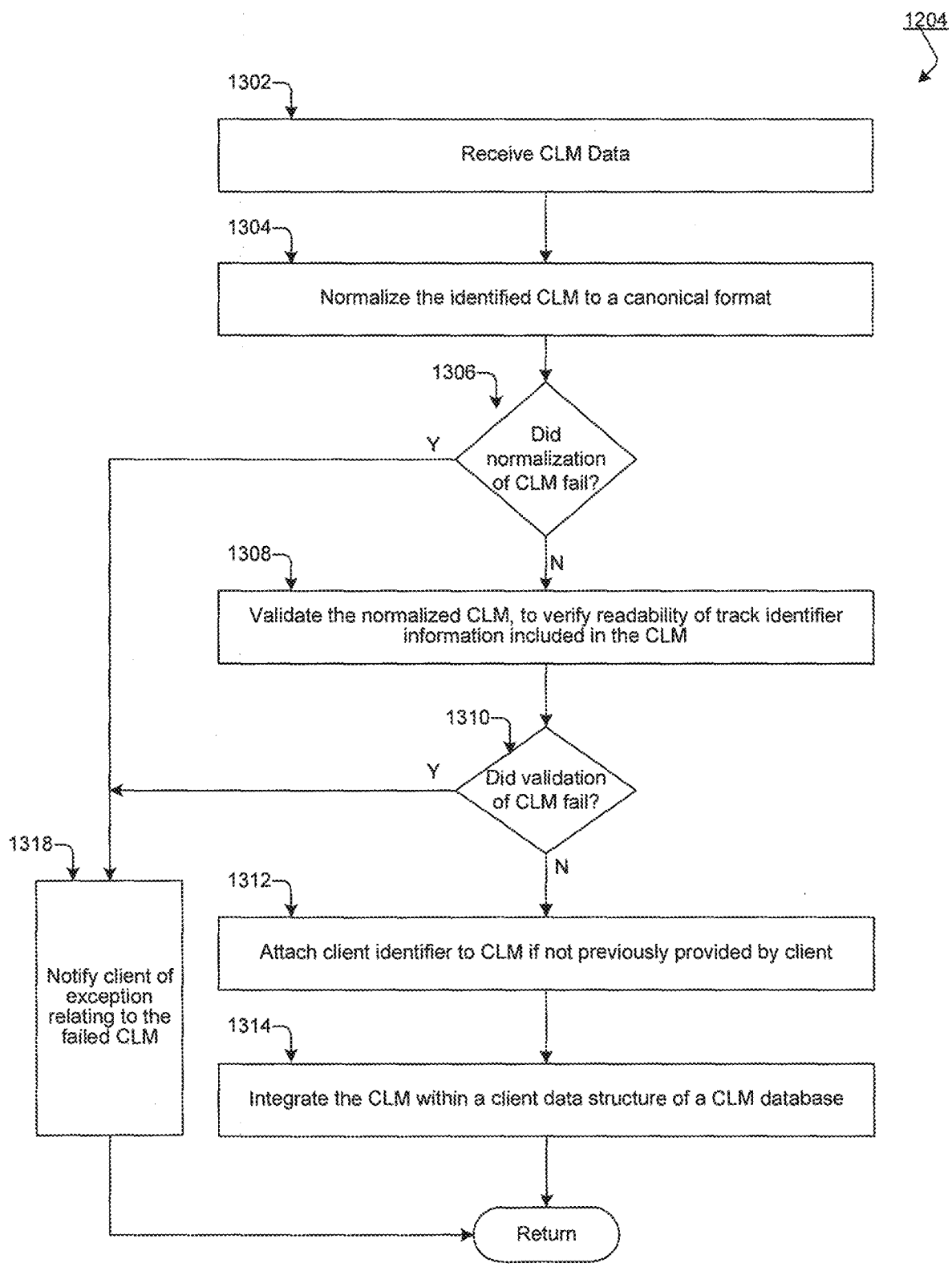
FIG. 2C is a flow diagram illustrating an example of a process for integrating the CLM data received from the client.

Subsequent to receiving the CLM data 1113 and/or client accounting data 2102, the receiving module 1172 conveys such information to a CLM integration module 1174 of the licensing subsystem 1150. FIG. 2C is a flow diagram depicting an exemplary process 1204 that the integration module 1174 utilizes to integrate the CLM data 1113. In one embodiment, as indicated in block 1302, the CLM integration module 1174 receives CLM data 1113 from, for example, the receiving block 1172. At block 1304, the CLM integration block 1174 normalizes the CLM data 1113 to a canonical format. In one example, the normalization process examines each CLM record, and eliminates potential row, field, and value anomalies (including incompatible foreign characters). The normalization process also enumerates any shorthand structures and grouped records into fully referential individual records. If the normalization process fails, as verified at block 1306, the received CLM is moved to an exception storage area, and the client 1112 is notified of the exception. Otherwise, the process 1204 moves to block 1308, where the CLM integration module 1174 validates the normalized CLM to verify the readability of the identifier information included in the CLM 1113. If the CLM integration module 1174 is unable to read the identifier information, as inquired at block 1310, the process 1204 shifts to block 1318. Otherwise, the process proceeds to block 1312. Here, the CLM integration block attaches a unique client ID to the CLM 1113 (e.g., as additional metadata in the CLM data file). Subsequently, the CLM integration module 1174 integrates the CLM file 1113 within a CLM database 1190 associated with the administration server 1164.

CLM Matching

Subsequent to the CLM integration operation, the CLM matching module 1176 operates on the CLM data 1113 stored in the CLM database 1190 to match the sound recording (as identified by the CLM data 1113) with composition and publisher information from a publishing information data structure (PIDS) 1194 associated with the administration server 1164. In one embodiment, the PIDS 1194 is as a database that stores, for example, composition, copyright, and publisher information associated with an enormous corpus of sound recordings. As will be explained in detail below, the CLM matching module 1176 matches the record of a particular sound recording identified in the received CLM 1113 to a particular record (storing, copyright information, publisher information, etc. for a given musical composition) in the PIDS 1194.

The CLM matching module 1176 performs one or more of the following processes to ensure that the sound recording identified in the CLM data 1113 is matched to a known record in the PIDS 1194: a primary (systemic) matching process that includes a phase 1 (syntax matching) operation and a phase 2 (extended matching) operation; and a secondary (manual) matching process.

Figure 3A:
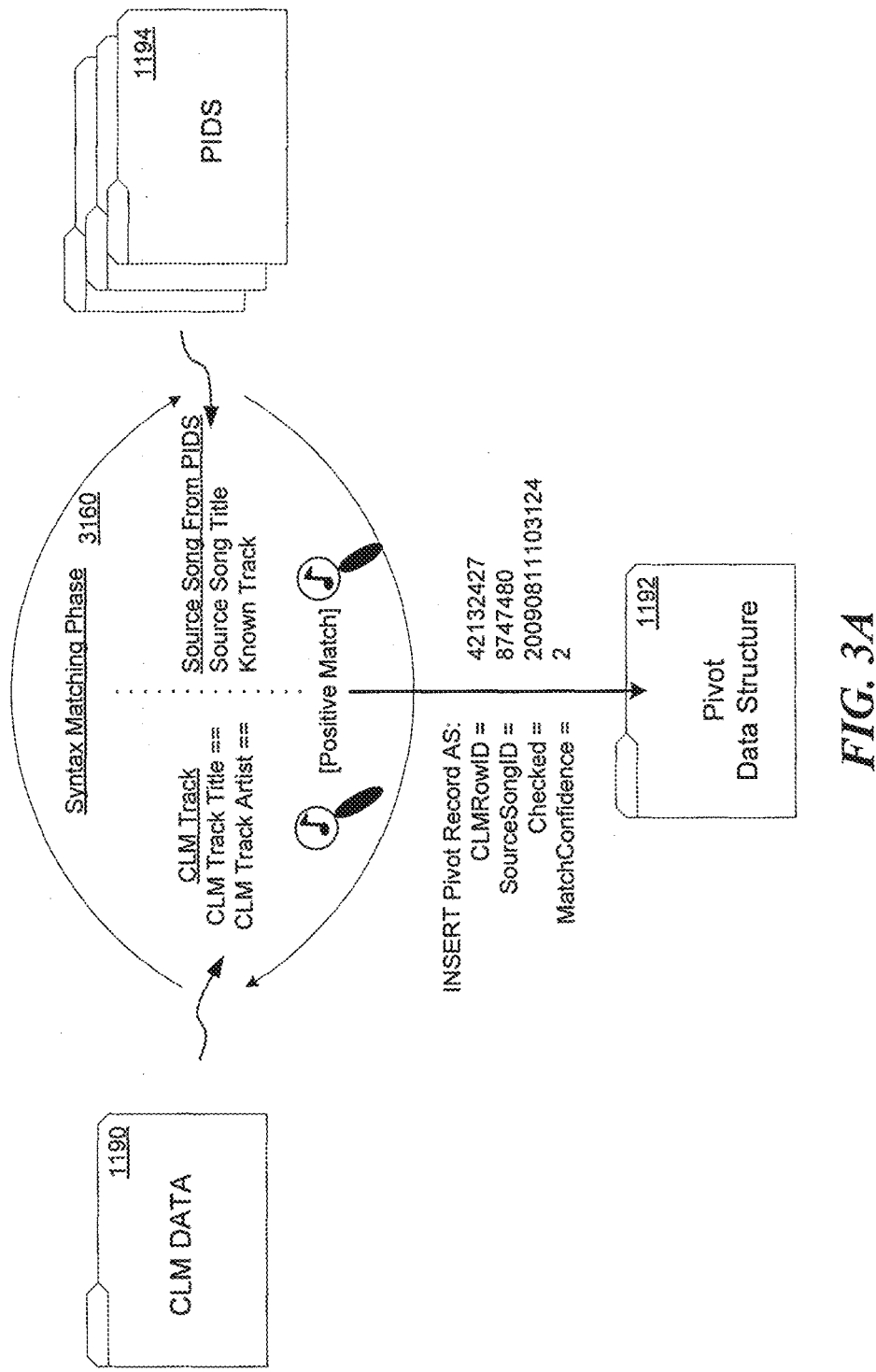
FIG. 3A is an exemplary illustration of phase 1 (syntax matching) of the primary (systemic) matching process.

FIG. 3A is a block diagram illustrating the phase 1 (syntax matching) operation of the primary (systemic) matching process. In this operation, the CLM matching module 1176 utilizes syntax-matching algorithms to match the CLM data 1190 against a known record in the PIDS 1194, using only the primary identifiers 2224 (e.g., track title, track artist) included in the CLM data 1190. For example, as illustrated in block 3160, the CLM matching module 1176 verifies whether a CLM track title and/or a CLM track artist from the CLM track 1190 matches a track title and/or track artist from the PIDS 1194. If a match is found, the CLM matching module 1176 inserts a new pivot record (corresponding to the match) in a CLM pivot data structure 1192.

In one embodiment, the CLM pivot data structure 1192 is a database comprising a unique pivot record for every successfully matched record in the CLM database 1190. Following a successful match, the CLM matching module 1176 includes one or more of the following fields into each such unique record: a CLM row ID (e.g., to identify a location of the CLM data 1113 in the CLM database 1190), a source song ID (e.g., identifying a corresponding known record in the PIDS 1194), a match confidence (e.g., indicating a level of confidence based on the results of the syntax search algorithms, etc.), a pivot ID (e.g., indicating a location of the unique record within the CLM pivot data structure 1192), etc.

Figure 3B:
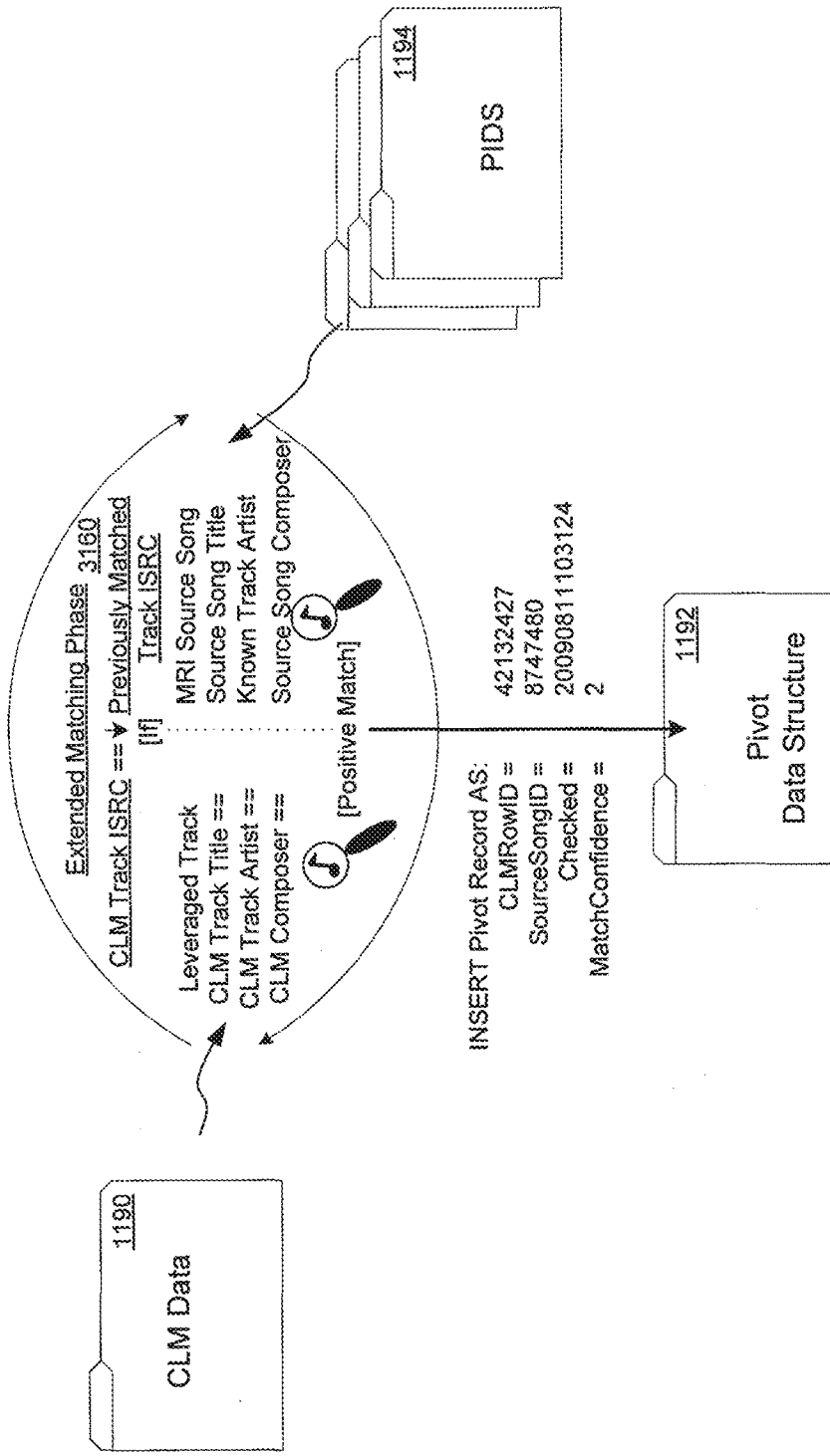
FIG. 3B is an exemplary illustration of phase 2 (extended matching) of the primary (systemic) matching process.

If the CLM matching module 1176 is unable to match a record from the CLM database 1190 based on a systemic matching of the primary identifiers 2224, the CLM matching module 1176 performs a phase 2 (extended matching) operation of the systemic matching process. This operation is illustrated in FIG. 3B. Here, in addition to the primary identifiers 2224 included in the CLM data 1190, the CLM matching module 1176 uses one or more of the extended identifiers 2226 to match against known records in the PIDS 1194. For example, as illustrated in block 3160 of FIG. 3B, the CLM matching module 1176 compares extended identifiers 2226 such as ISRC, album information, track number, etc. against values associated with records stored in the PIDS 1194. If the extended matching phase results in a positive match, the CLM matching module records a corresponding unique pivot entry in the CLM pivot data structure 1192.

It is worthwhile to note that the extended matching phase is performed only if the primary matching phase does not yield a positive result. This is because use of the primary identifiers 2224 alone results in fewer processing cycles reducing search latency and minimizing cost.

In some instances, the CLM matching module 1176 stages the CLM data files to be matched in a CLM sandbox before performing the various systemic matching operations. Sandboxing the CLM database 1190 to be evaluated facilitates a unified index of unevaluated records. This enables, for example, (simultaneous) multiple processing instances of the systemic matching operation, where the primary matching process is executed multiple times in tandem to expedite processing.

Figure 3C:
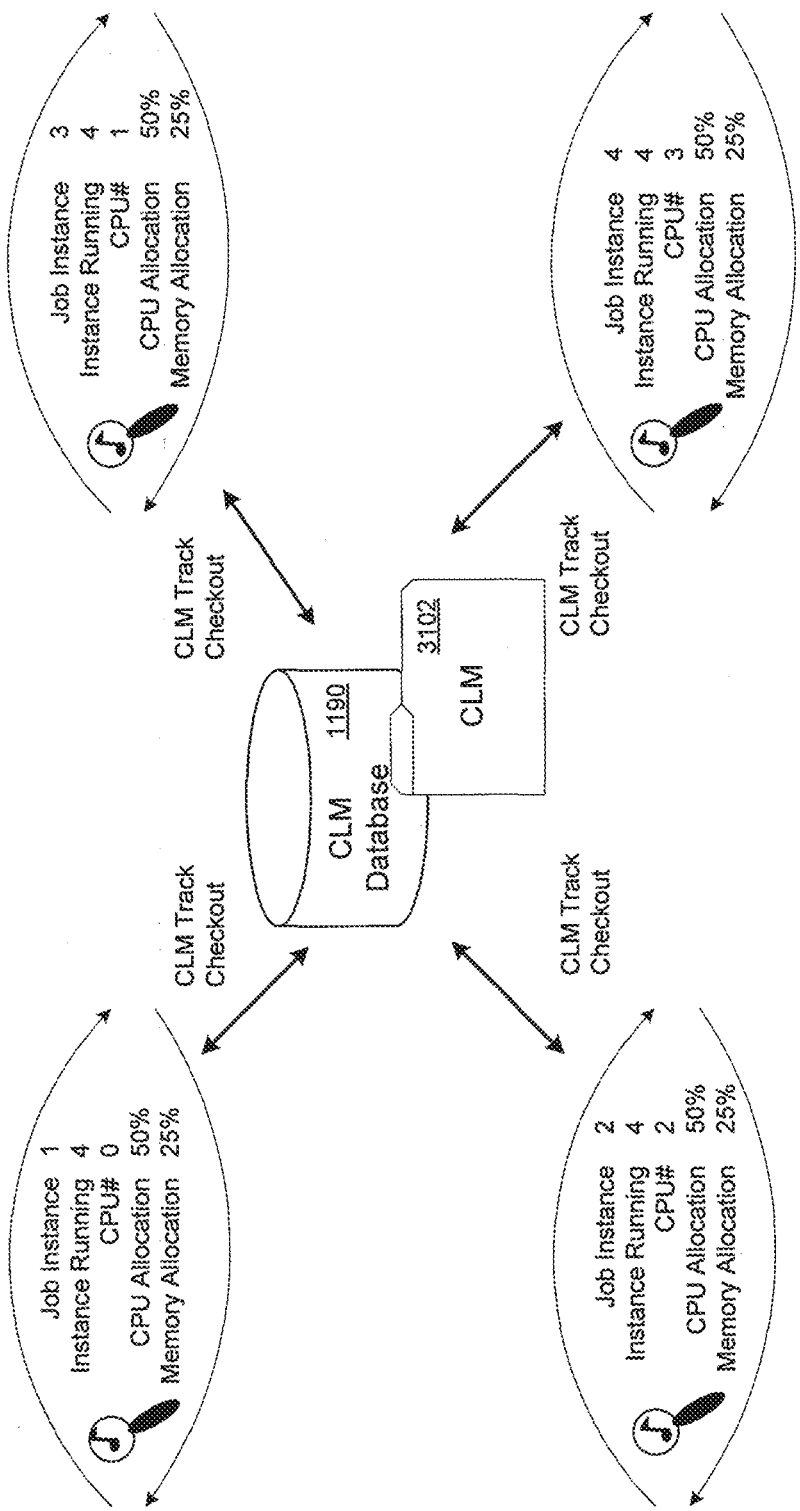
FIG. 3C illustrates a multi-threading approach for the primary (systemic) matching process.

FIG. 3C is a block diagram illustrating such a multi-threading approach for the primary (systemic) matching process. As illustrated in FIG. 3C, in order to increase processing performance (by reducing the amount of time required to complete one systemic match cycle), the CLM matching module 1176 runs multiple process threads. Here, a thread identifier (e.g., an integer value) is assigned to each thread. Information about the various threads (e.g., thread ID, sandbox batch ID, integer value representing concurrent number of threads, etc.) are passed to each thread via constructor arguments. Using this information, each thread becomes aware of other threads of the systemic matching process, allowing each thread to intelligently request resource allocations (e.g., processor time, memory, etc.), thus maintaining equilibrium of the overall systemic match process.

Figure 3D:
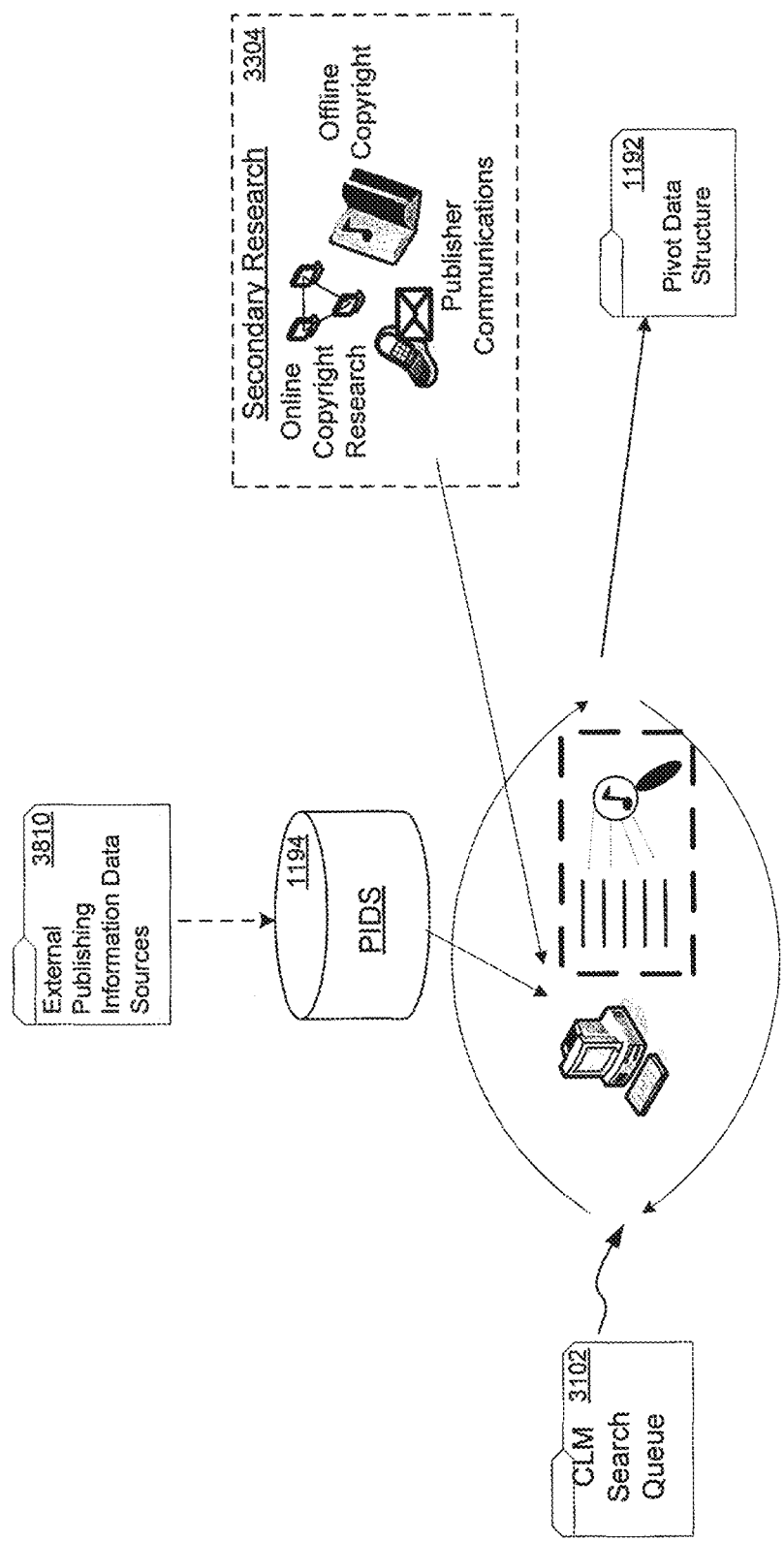
FIG. 3D is an exemplary illustration of the secondary (manual) matching process.

At the end of the primary (systemic) matching process, the CLM matching module 1176 determines whether there are any CLM files that are yet to be matched to a record from the PIDS 1194. If the CLM matching module 1176 detects the presence of such files, it tags such files for submission to a secondary (manual) matching process. FIG. 3D is a block diagram providing an exemplary illustration of such a secondary matching process. In one example, the CLM matching module 1176 prepares a list of unmatched CLM files and submits it to a secondary matching queue.

The secondary matching is performed, for example, by a user using additional functionalities provided by the CLM matching module 1176. In one embodiment, the CLM matching module 1176 provides a "point and shoot" research interface. In one example, this interface provides a split window view, with a top half of the interface window containing a table listing the unmatched tracks from the secondary matching queue. A bottom half of the interface window contains a table listing potential composition matches for the track selected in the unmatched tracks table. The composition table automatically populates as selections are made in the unmatched tracks table.

If the user cannot identify a composition in the list provided, or there are no potential matches listed, a search feature can be manually utilized to search through the PIDS 1194 on a variety of query parameters that may lead to a matching composition being discovered. The user selects, for example, a search function, which opens an interface presenting the ability to search on title, artist, composer, data source, and other potential attributes. The user may then select an execute function, which executes the query and returns the results to the composition table in the bottom half of the "Point and Shoot" interface.

If the user can identify a composition in the composition table, he selects the composition in the table and then selects "Match." A new pivot record is then created in the CLM Pivot Data Structure 1194 (with, in addition to other parameters, a match confidence ranking indicating the match was made via the manual match process).

If no record in the composition table matches the subject record in the CLM database (1190) and no matching composition can be found via the search function, manual research must be performed to collect information (e.g., through external publishing information sources 3810 or secondary research processes 3304) to identify the underlying composition copyrights associated with such record in the CLM database (1190). The user may refer to, for example, industry web sites, industry books, physical phonorecord label copy, and in some cases direct communication via email and phone with the parties involved with the sound recording and/or music publishers to collect this information. When sufficient information is retrieved, the user stores the record to the PIDS 1194. With the new composition record automatically selected, the CLM matching module 1176 creates a pivot record in the CLM pivot data structure 1192.

In some instances, if the manual research process fails to yield enough information, the user will flag the record for later review by selecting, for example, a "First-Pass" function, which prompts for an amount of time in which to wait before presenting the record again for manual matching. For example, the user may specify a period of six months to allow for the release of the proper composition information (e.g., for newly released sound recordings), at which time the unmatched track will reappear in the secondary matching queue for the client 1112.

Ultimately, if an unmatched track continues to appear in the secondary matching queue for the client 1112 for an excessive time period (e.g., for a period of more than two years), the CLM matching module 1176 (or the user using a manual process) marks the unmatched track as "Unmatchable" (through, for example, the PIDS 1194), and the CLM entry is excluded from future manual match processing.

Also, in some instances, unmatched tracks that do not qualify as sound recordings from compositions, such as, for example, comedy routines, and other non-composition audio are also marked as unmatchable and excluded from future match processing.

Figure 3E:
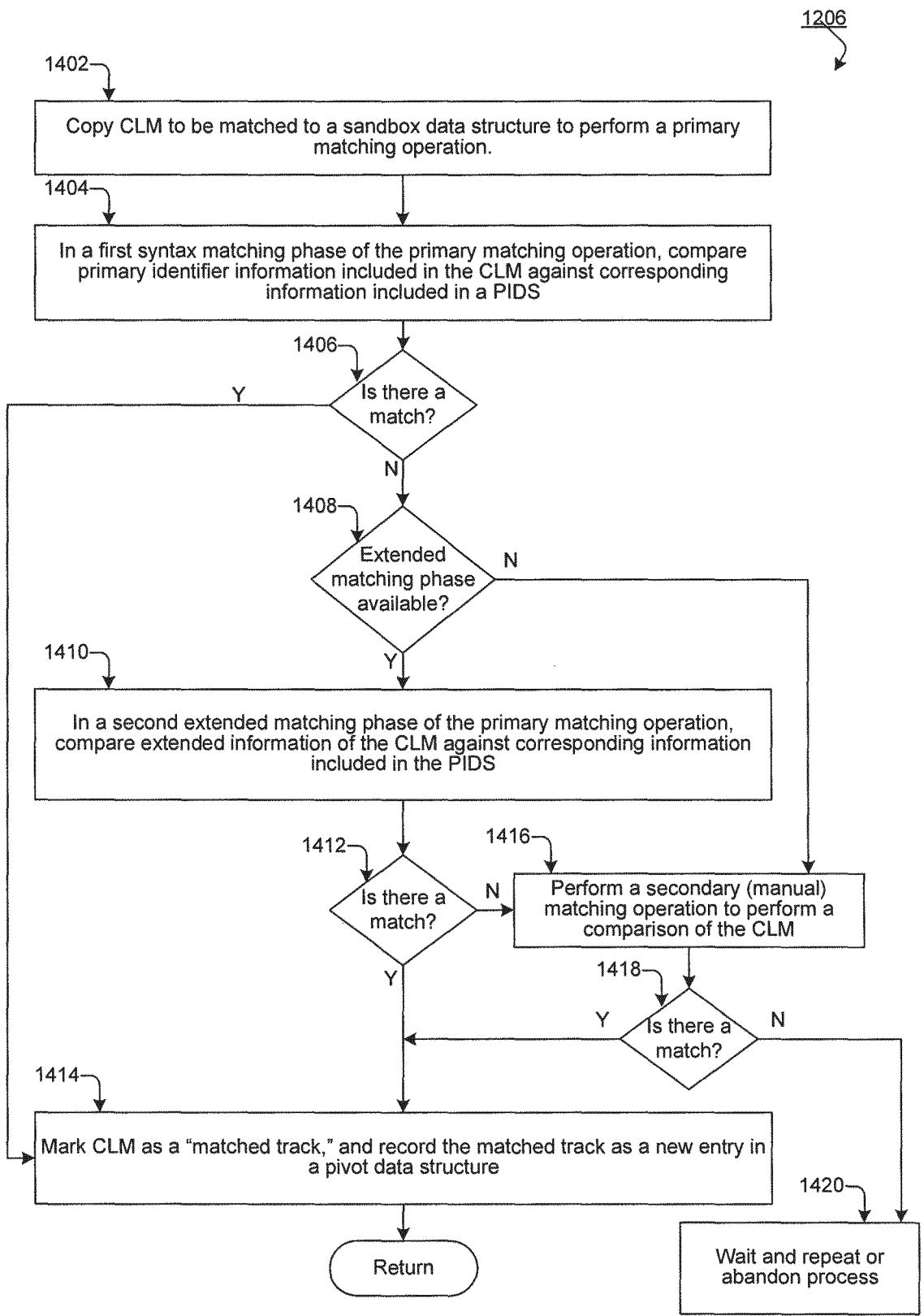
FIG. 3E is a flow diagram depicting an exemplary process for the CLM matching approach.

FIG. 3E presents a flow diagram illustrating an overall process 1206 used by the CLM matching module 1176. In some instances, as indicated in block 1402, the CLM data files that need to be matched are copied to a sandbox data structure to perform a primary matching operation. At block 1404, the CLM matching module 1176 performs a first syntax (systemic) matching process using primary identifier information 2224 of the CLM data. If there is a match, the process 1206 shifts from block 1406 to block 1414, where the CLM matching module 1176 inserts a new pivot record into the pivot data structure 1192. If there is no match, the process 1206 verifies, at block 1408, whether a secondary extended matching option is available. If the extended matching phase is available, the process 1206 proceeds to block 1410, where a second extended (systemic) matching operation is performed using extended identifiers 2226 of the CLM. If a match is found at block 1412, the process 1206 shifts to block 1414 for a new pivot entry. If no match is found, the process 1206 shifts to block 1416, where the CLM matching module submits an "unmatched queue" for a secondary (manual) matching operation. If the secondary (manual) matching operation yields a successful match, the process 1206 shifts to block 1414 for a new pivot entry. Otherwise, the process 1206 shifts to block 1420, where the process 1206 repeats after a specific period of time (e.g., after three months, six months, etc.), or the process 1206 marks the CLM as unmatchable and abandons the matching process for the particular CLM.

Licensing Operation

Subsequent to the various matching operations, a licensing module 1178 of the administration server 1164 performs a suite of licensing operations, as will be discussed below. Broadly, the licensing module 1178 performs one or more of the following operations: (1) identification of existing client-licenses; (2) a CRO license request and acquisition process; and (3) an NOI license invocation process.

Figure 4A:
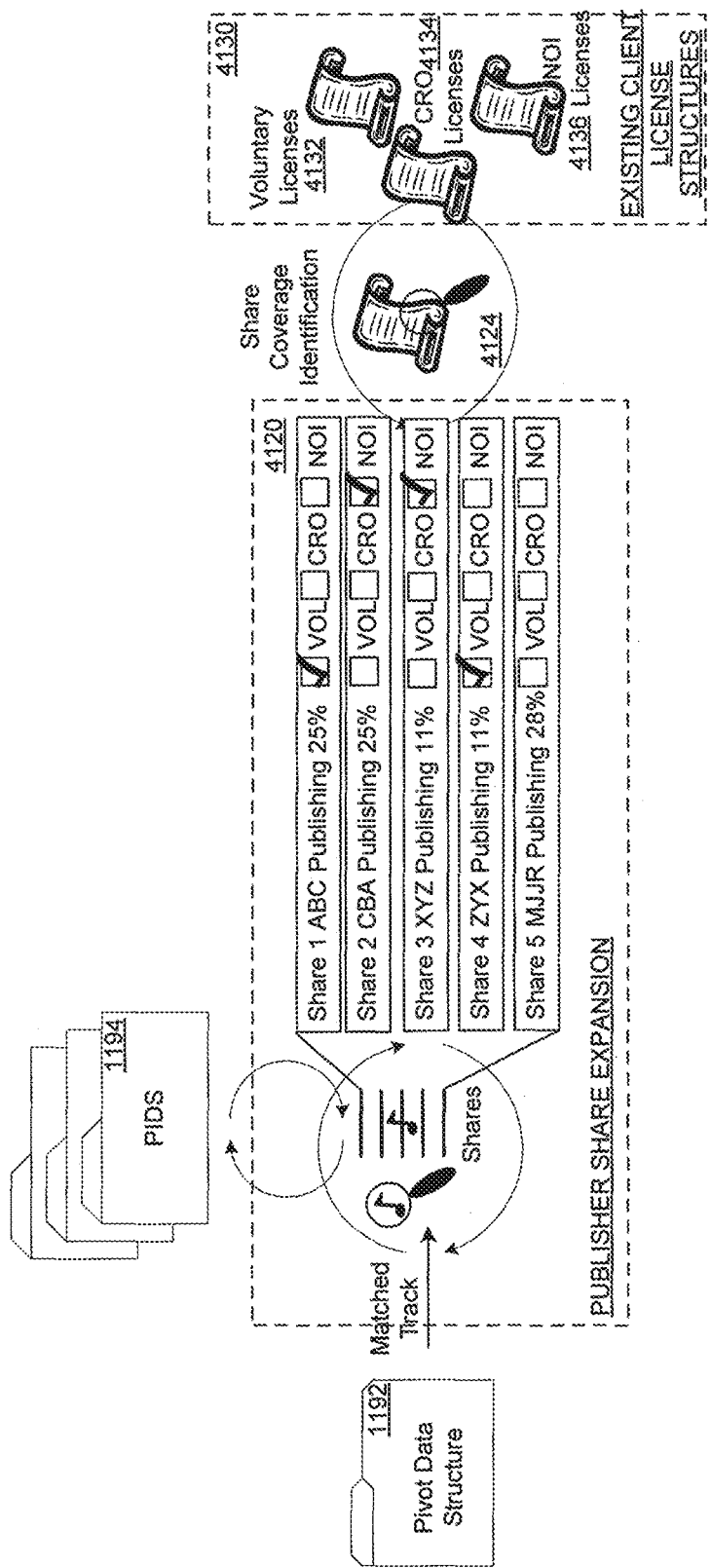
FIG. 4A is a block diagram illustrating the evaluation of matched CLM records against existing client-licenses.

FIG. 4A is a block diagram illustrating a process by which the licensing module 1178 identifies existing client licenses. As a first step of the licensing process, the licensing module 1178 expands publisher-share information corresponding to the source song ID corresponding to each CLM record to evaluate the client's 1112 current publishing license coverage. In some instances, the client 1112 may already have a preexisting licensing agreement with a particular rights holder, thus obviating the need to acquire a license for particular publisher-shares. As shown in FIG. 4A, the licensing module 1178 retrieves an entry from the pivot data structure 1192 to perform the licensing operation. In some embodiments, the licensing module 1178 then performs a publisher share expansion 4120 to determine the license coverage of the various publisher-shares corresponding to the received pivot entry, by communicating with the PIDS 1194 to retrieve publisher-share information for the matched musical composition corresponding to the pivot entry.

In the example shown in FIG. 4A, the musical composition embodied in the sound recording comprises five publisher-shares. The publisher share expansion 4120 further indicates the percentage-share of each publisher-share. For example, the rights holder of Share 1 (ABC Publishing) has a 25% share, meaning that ABC publishing is entitled to 25% of the overall royalty share for the corresponding sound recording. Further, the matching module uses existing client license structures 4130 to determine the licensing mechanism for each identified publisher-share.

As indicated above, the client may already have a licensing agreement with certain rights holders. If the existing client license structures 4130 indicate that any of the shares are already under a voluntarily negotiated license agreement, the licensing module 1178 marks such publisher-shares as "VOL," meaning that such shares are covered by an existing voluntary licensing agreement. If the existing client license structures 4130 indicate that any of the shares are already under a license agreement through a collective rights organization ("CRO"), or through a compulsory statutory license invoked by a Notice of Intent to Obtain a Compulsory License ("NOI"), then such existing licenses are marked accordingly. In the example of FIG. 4A, Shares 1 and 4 are licensed under an existing voluntary license agreement, shares 2 and 3 are licensed under an e NOI. Accordingly, the licensing module 1178 needs to consider only share 5 for further processing (e.g., to acquire a license for that share, and thereby to complete the licensing of all shares of the work).

Figure 4B:
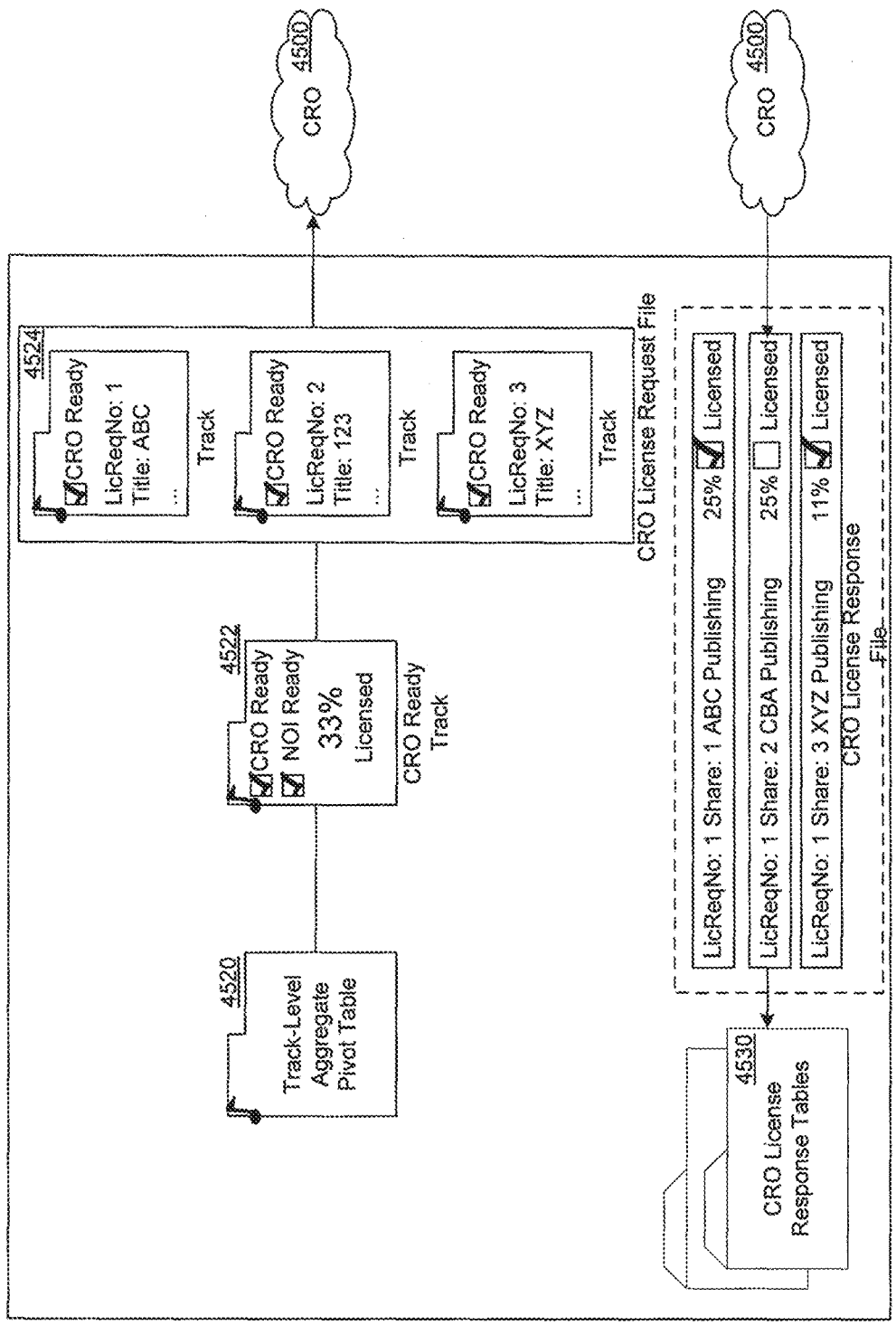
FIG. 4B is an exemplary illustration of the CRO license acquisition process.

Subsequent to evaluating existing licenses, the licensing module 1178 proceeds to perform a license acquisition process for the publisher-shares that are not already covered under an existing licensing agreement. For this operation, the licensing module first looks at whether the client 1112 has an agreement with a collective rights organization (e.g., the Harry Fox Agency ("HFA"), the Canadian Musical Reproduction Rights Agency ("CMRRA"), etc.). If the client 1112 has such an agreement, the licensing module 1178 submits the unlicensed shares to the, collective rights organization license acquisition process. FIG. 4B is a block diagram illustrating such a collective rights organization license acquisition mechanism. Here, the licensing module 1178 combines the unlicensed publisher-shares (i.e., the publisher-shares not covered under an existing license agreement) to prepare for license request submission. The collective rights organization is an agency whereby a multiplicity of publishers and other musical composition rights holders can coordinate licensing with a multiplicity of music services.

In some instances, the licensing module 1178 places such publisher-shares in a CRO ready track table 4522. The licensing module 1178 then copies the CRO track data to a staging schema 4524 that includes, for example, the title of the sound recording for which the share is a part, a unique request ID, etc., according to specifications dictated by the applicable CRO. The licensing module 1178 then exports the staged records in a file format dictated by the CRO 4500. In some instances, the licensing module 1178 submits the records to the CRO 4500 using the network 1140 (e.g., by an FTP transfer, or by transmitting the record by email, etc.).

The CRO 4500 maintains a matching and licensing system which evaluates submitted license requests on a track level by identifying the underlying copyright shares for each underlying sound recording, and grants licenses for publisher-shares where CRO 4500 is able to identify publisher-shares held by its members, and is authorized to license such publisher-shares. If the CRO 4500 is unable to license a particular publisher-share, it returns a code to the licensing module 1178 indicating that the applicable share is not licensed. Subsequent to completion of the licensing process, the CRO 4500 returns a response file to the licensing module 1178. The licensing module 1178 receives, for example, a CRO response file, which indicates which of the shares submitted for CRO licensing have been licensed. Based on this information, the licensing module 1178 enters the newly granted CRO licenses within, for example, a CRO license response database 4530.

The licensing module 1178 then determines whether any of the remaining publisher-shares are still without a licensing agreement. This may be because the client 1112 does not have an agreement with a CRO or because the CRO was unable to grant a license for those publisher-shares. In such an event, the licensing module 1178 submits the remaining unlicensed publisher-shares to the NOI licensing mechanism.

The statutory compulsory mechanical license requirements are outlined in Section 115 of the Copyright Act and allow a client to reproduce and distribute a musical composition without obtaining permission from the copyright holders by serving an NOI on any one of them.

Figure 4C:
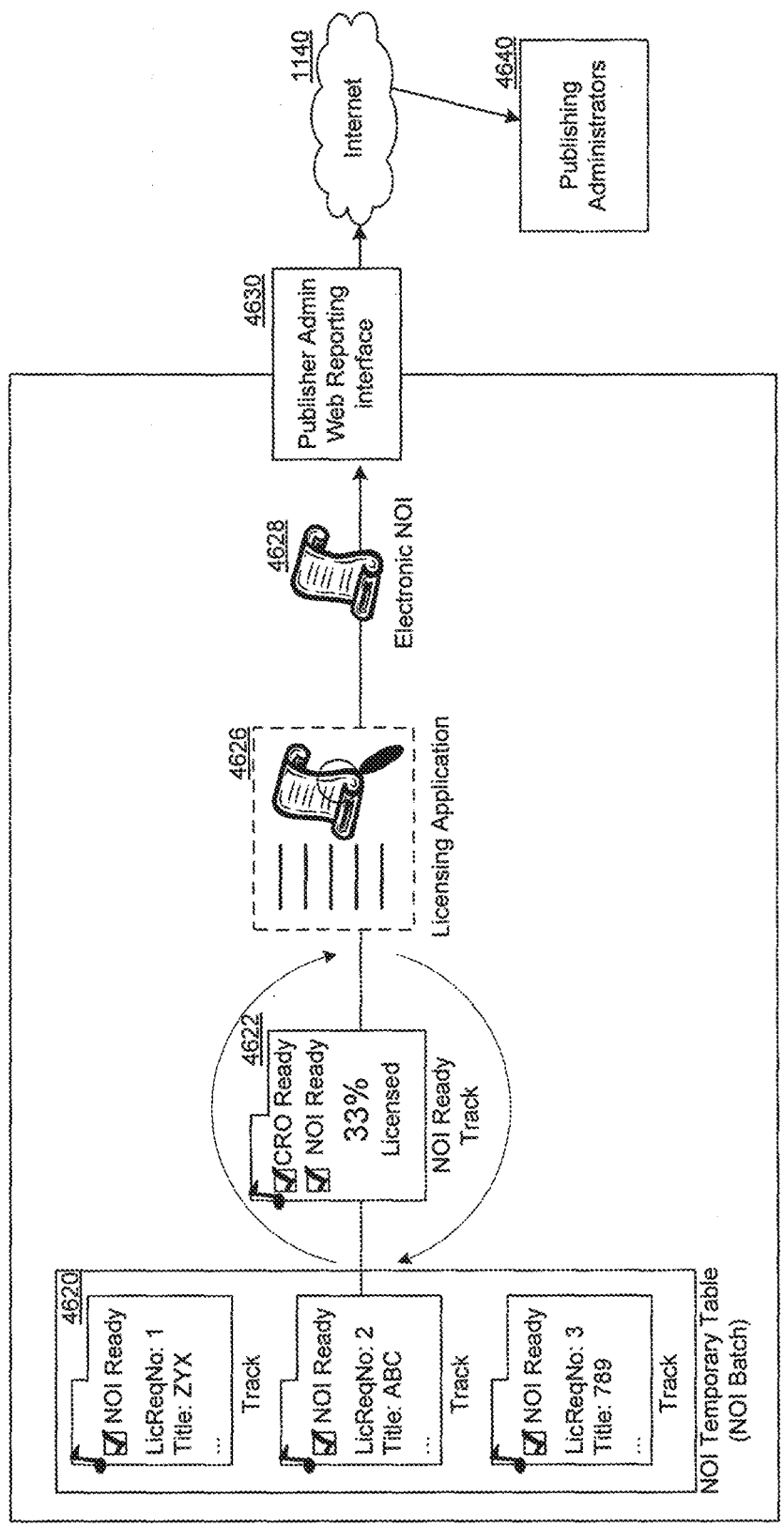
FIG. 4C is an exemplary illustration of the NOI license invocation process.

FIG. 4C is a block diagram illustrating an exemplary NOI licensing mechanism. Here, the licensing module 1178 identifies the various publisher-shares that require an NOI license and stages them in an NOI ready track table 4622, with information relating to the musical composition (that includes, for example, the title of the musical composition of which the publisher-share is a part, a unique request ID, etc.). An NOI licensing application 4626 then begins a NOI generation process, in which a NOI license package 4628 (which includes an NOI, a list of musical compositions to be covered by the NOI, a NOI ID, a cover letter to the rights holder, etc.) is assembled with publisher-share records from the NOI ready track table 4622. The licensing module 1178 then determines whether the applicable rights holder has previously agreed to accept NOIs electronically from the client, and if so the licensing application 4626 publishes the NOI package 4628 electronically to a publisher admin web reporting interface 4630. This interface 4630 is available to publishing administrators 4640 through the Internet 1140. Alternatively, if the applicable rights holder has not previously agreed to accept NOIs electronically, the licensing application 4626 prints the NOI package for mailing to the rights holder.

Once a NOI package 4628 is posted to a publishing administrator's web reporting interface 4630, the song shares within that NOI package 4628 are considered licensed, and will be included in the next license status report 5014 transmitted to the client. Alternatively, if mailed, and if after a period of time chosen by the client the NOI package 4628 is not returned to the service, the song shares within that NOI package 4628 are considered licensed, and will be included in the next license status report 5014 transmitted to the client. If a NOI packet 4628 is returned for any delivery failure, such as incorrect address, the NOI in question is considered invalid, and the client's license structure 4130 is updated to prevent any compositions associated with such NOI from being identified to the client as licensed or, if they have been previously included in a license status report 5014 transmitted to the client, to delete such compositions from the next license status report transmitted to the client 5014.

Figure 4D:
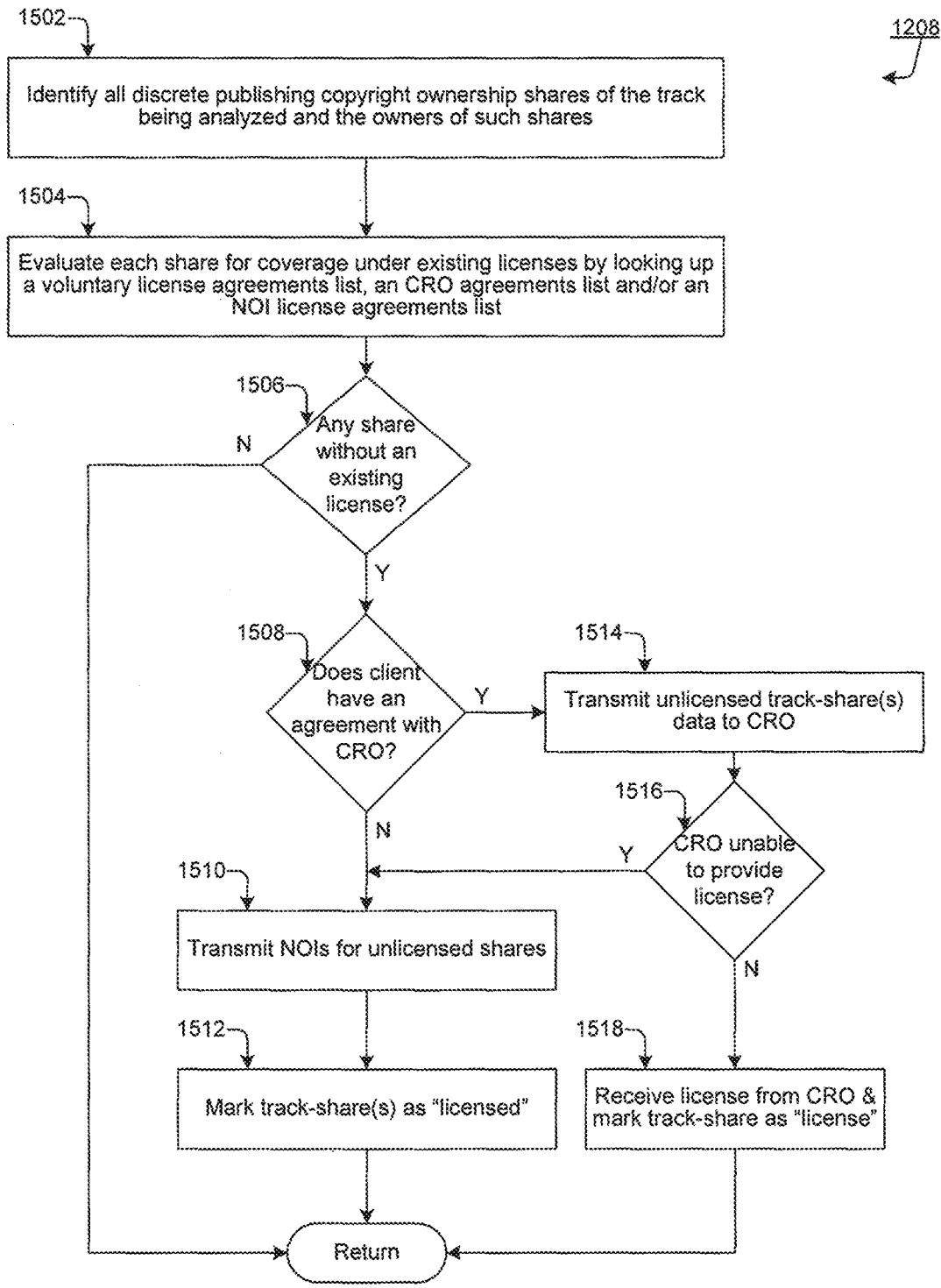
FIG. 4D is a flow diagram depicting an exemplary flow of the overall licensing process.

FIG. 4D is a flow diagram illustrating an example of an overall process 1208 used by the licensing module 1178. At block 1502, the licensing module 1178 identifies all discrete publisher-shares corresponding to the previously matched CLM records. At block 1504, the licensing module 1178 identifies whether any of the publisher-shares are covered under an existing license agreement. At block 1506, the licensing module 1178 determines if there is any publisher-share that is not covered under an existing licensing agreement. If the licensing module 1178 detects the presence of such publisher-shares, the process shifts to block 1508, where the licensing module 1178 verifies whether the client 1112 has an existing CRO license agreement. If the client 1112 has an existing agreement, the process shifts to block 1514, where the licensing module 1178 transmits the unlicensed publisher-share to a CRO for licensing. If the CRO is unable to provide a license for any publisher-share (as indicated in block 1516) or if the client does not have an agreement with a CRO (as indicated in block 1508), the process shifts to block 1510, where the publisher-shares are processed for NOI licensing. Depending on the type of licensing, the licensing module 1178 receives notification of licensed status through NOI (block 1512) or through the CRO (block 1518).

Subsequent to completion of the licensing operation, the goal is for the musical composition embodied in each sound recording associated with each CLM record received from the client 1112 to be completely licensed (i.e., a license has been established for each publisher-share corresponding to the sound recording identified by each record of the CLM).

Accounting and Reporting Operations

Subsequent to ensuring that the musical compositions embodied in the sound recordings associated with the CLM data 1113 received from the client 1112 have been completely licensed, an accounting module 1180 of the administrator server's 1164 accounting subsystem 1152 performs an accounting operation. In some instances, the accounting module 1180 communicates with the receiving module 1172 to receive the client accounting data 2102 transmitted by the client 1112. Using the client accounting data 2102, the accounting module 1180 retrieves data for a relevant accounting period for the licensed sound recordings. Using this information, and using the percentage-share information associated with each publisher-share, the accounting module 1180 computes total royalty payments the client 1112 needs to make to the identified rights holders.

A reporting module 1182 of the accounting subsystem 1152 performs a reporting operation to update the client with licensing and royalty related information. In one embodiment, the reporting module 1182 generates a report specifying, for each CLM record received from the client 1112, a license status report (indicating, for example, the extent to which each sound recording identified in the CLM data 1113 is licensed). Additionally, the reporting module 1182 may also prepare a report on the total royalties that are due from the client 1112 to the various rights holders for an accounting period. The reporting module 1182 may also request overall royalty funds from the client.

The accounting subsystem 1152 further includes a payment module 1184 to receive a royalty payment from the client 1112, and also to transfer royalty payments to the various rights-holders (as indicated by the accounting module 1180). Additionally, the reporting module 1182 may be further configured to prepare a report on the royalty payments and license usage information to the various rights holders.

Figure 5:
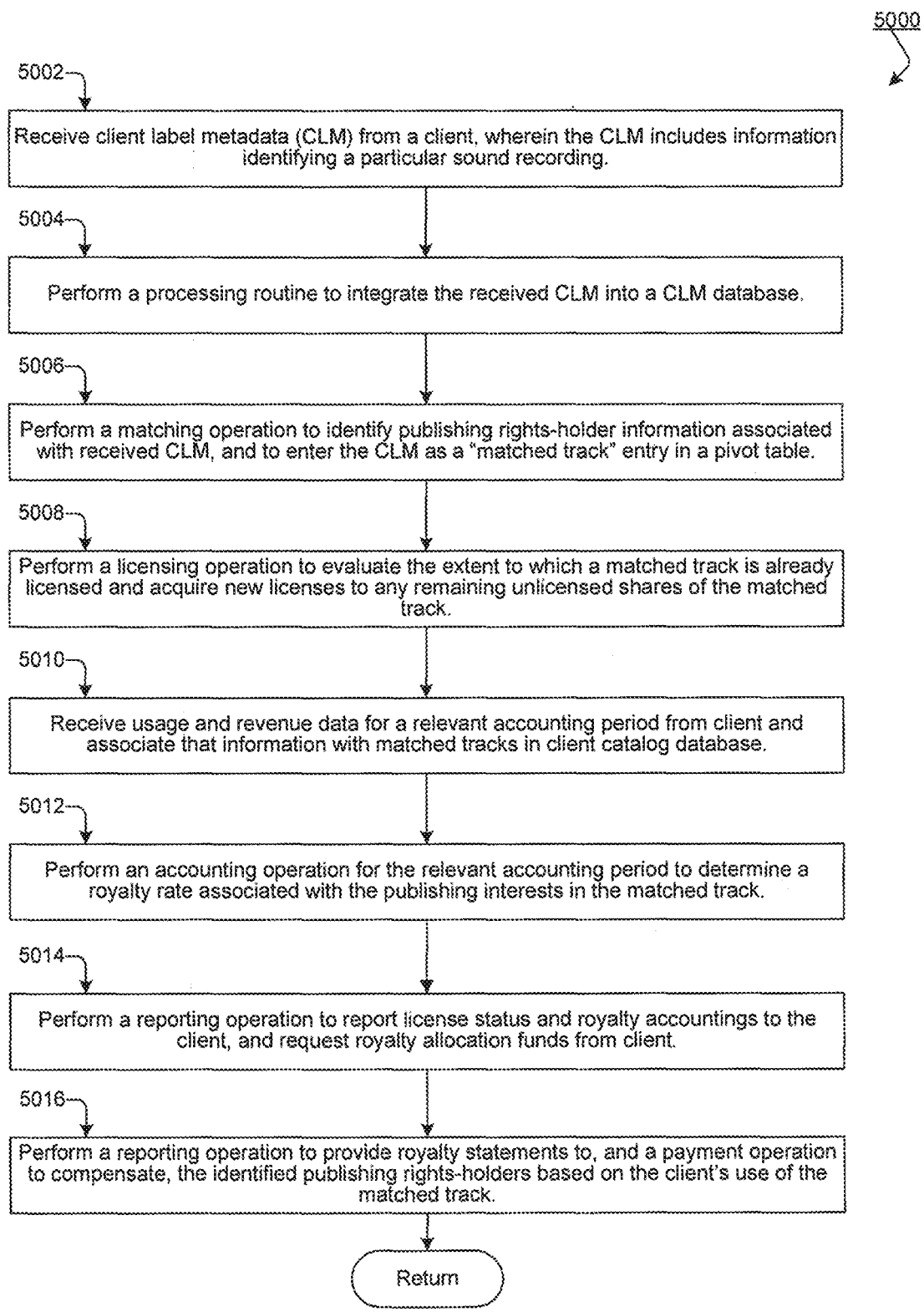
FIG. 5 is a flow diagram illustrating an example of the overall process of the musical works administration service.

FIG. 5 is a flow diagram illustrating an exemplary overall process 5000 performed by the musical works administration service 1160. In one embodiment, the process 5000 receives, at block 5002, CLM data from a client, wherein the CLM data consists of information identifying a sound recording. At block 5004, the process 5000 then performs a processing routine to integrate the received CLM into a normalized CLM database. At block 5006, the process 5000 performs a matching operation to identify publishing rights-holder information associated with the sound recording identified in the received CLM, and to enter the CLM as a "matched sound recording" entry in a pivot table. At block 5008, the process 5000 performs a licensing operation to evaluate the extent to which the musical composition embodied in a matched sound recording are already licensed and acquire new licenses for any remaining unlicensed publishing shares of the matched sound recording. At block 5010, the process 5000 receives client accounting data 2102 for a relevant accounting period from the client and associates that information with matched sound recordings. At block 5012, the process 5000 performs an accounting operation for the relevant accounting period to determine a royalty rate associated with such usage. At block 5014, the process 5000 performs a reporting operation to report license status and royalty obligations to the client, and requests royalty funds from the client. Finally, at block 5016, the process 5000 performs a reporting operation to provide royalty statements to, and a payment operation to compensate, the identified publishing rights-holders based on the client's usage of the matched sound recording.

Figure 6:
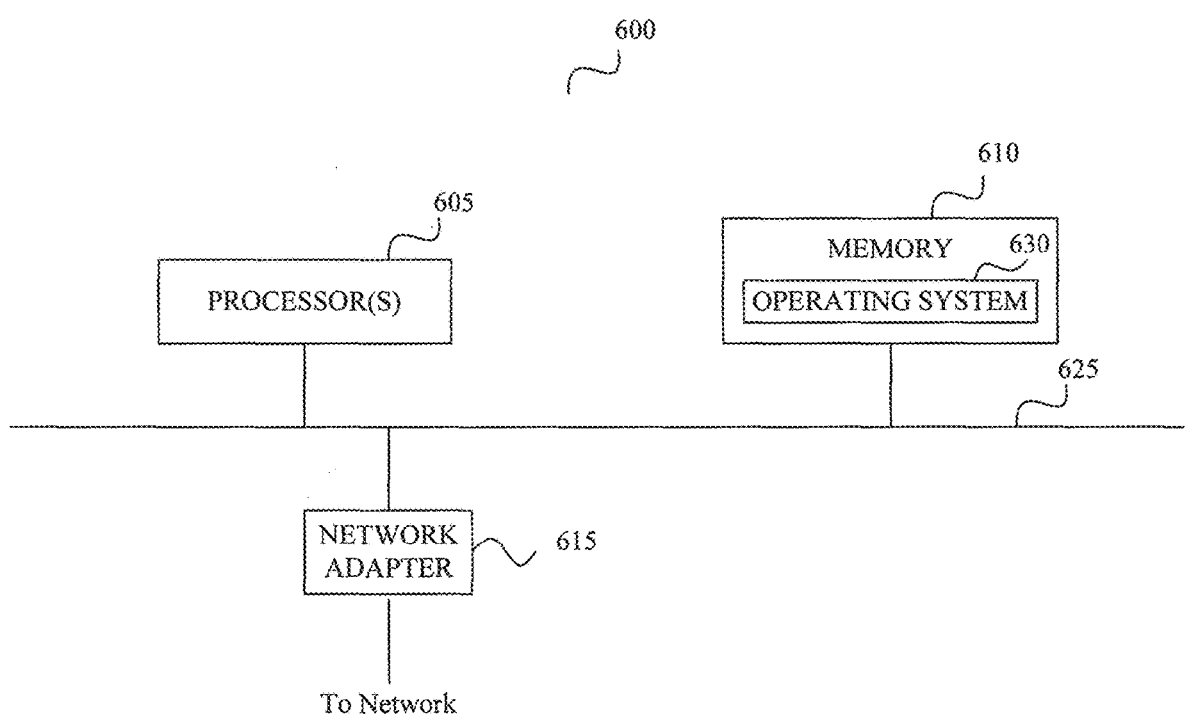
FIG. 6 is a high-level block diagram showing an example of the architecture for a computer system.

FIG. 6 is a high-level block diagram showing an example of the architecture for a computer system 600 that can be utilized to implement an administration server (e.g., 1164 from FIG. 1). In FIG. 6, the computer system 600 includes one or more processors 605 and memory 610 connected via an interconnect 625. The interconnect 625 is an abstraction that represents any one or more separate physical buses, point to point connections, or both connected by appropriate bridges, adapters, or controllers. The interconnect 625, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 694 bus, sometimes referred to as "Firewire".

The processor(s) 605 may include central processing units (CPUs) to control the overall operation of, for example, the host computer. In certain embodiments, the processor(s) 605 accomplish this by executing software or firmware stored in memory 610. The processor(s) 605 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 610 is or includes the main memory of the computer system 600. The memory 610 represents any form of random access memory (RAM), read-only memory (ROM), flash memory (as discussed above), or the like, or a combination of such devices. In use, the memory 610 may contain, among other things, a set of machine instructions which, when executed by processor 605, causes the processor 605 to perform operations to implement embodiments of the present invention.

Also connected to the processor(s) 605 through the interconnect 625 is a network adapter 615. The network adapter 615 provides the computer system 600 with the ability to communicate with remote devices, such as the storage clients, and/or other storage servers, and may be, for example, an Ethernet adapter or Fiber Channel adapter.

Unless the context clearly requires otherwise, throughout the description and the claims, the words "comprise," "comprising," and the like are to be construed in an inclusive sense (i.e., to say, in the sense of "including, but not limited to"), as opposed to an exclusive or exhaustive sense. As used herein, the terms "connected," "coupled," or any variant thereof means any connection or coupling, either direct or indirect, between two or more elements. Such a coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. While processes or blocks are presented in a given order in this application, alternative implementations may perform routines having steps performed in a different order, or employ systems having blocks in a different order. Some processes or blocks may be deleted, moved, added, subdivided, combined, and/or modified to provide alternative or sub-combinations. Also, while processes or blocks are at times shown as being performed in series, these processes or blocks may instead be performed or implemented in parallel, or may be performed at different times. Further any specific numbers noted herein are only examples. It is understood that alternative implementations may employ differing values or ranges.

The various illustrations and teachings provided herein can also be applied to systems other than the system described above. The elements and acts of the various examples described above can be combined to provide further implementations of the invention.

Any patents and applications and other references noted above, including any that may be listed in accompanying filing papers, are incorporated herein by reference. Aspects of the invention can be modified, if necessary, to employ the systems, functions, and concepts included in such references to provide further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

While certain aspects of the invention are presented below in certain claim forms, the applicant contemplates the various aspects of the invention in any number of claim forms. For example, while only one aspect of the invention is recited as a means-plus-function claim under 35 U.S.C. § 112, sixth paragraph, other aspects may likewise be embodied as a means-plus-function claim, or in other forms, such as being embodied in a computer-readable medium. (Any claims intended to be treated under 35 U.S.C. § 112, ¶6 will begin with the words "means for.") Accordingly, the applicant reserves the right to add additional claims after filing the application to pursue such additional claim forms for other aspects of the invention.

The invention claimed is:

1. A method for providing a licensing service to an online music service provider, the method comprising:
   a) receiving from the online music service provider, at an administration server, a request for providing administration service for a first sound recording, and a first set of client label metadata (CLM) including track identifier information of the first sound recording;
   b) integrating the first CLM into a CLM database to provide an incorporated first CLM comprising one or more primary identifiers and/or one or more extended identifiers,
   c) matching the incorporated first CLM with a musical composition entry from a publishing information database (PID) comprising:
   c-1) comparing, by the administration server, one or more primary identifiers of the incorporated first CLM and the primary identifiers stored in the PID;

c-2) when step c-1) identifies the musical composition entry from the PID corresponding to the first sound recording, a new entry is entered into a CLM pivot data structure comprising a unique pivot record for every successfully matched record in the CLM database, wherein the new entry comprises one or more fields selected from the group consisting of a first CLM row ID identifying a location of the first CLM data in the CLM database, a source song ID identifying the corresponding musical composition entry in the PIDs, a match confidence indicating a level of confidence based on the results of the comparison of step c-1), and a pivot ID indicating the unique record within the CLM pivot data structure; and c-3) when step c-1) fails to match a musical composition entry from the PID with the first sound recording, one or more of the extended identifiers are used to match against the musical composition entries in the PIDs, and a new entry is entered into the CLM pivot data structure as described in step c-2);

d) identifying, by the administration server, based on the information stored in association with the musical composition entry of the PID corresponding to the first sound recording, one or more publisher-shares, wherein each publisher-share represents an entity holding a copyright interest in at least a portion of a musical composition embodied in the first sound recording;

e) identifying, by the administration server, whether each of the one or more identified publisher-shares identified in step d) is covered under a preexisting license; and f) automatically executing, by the administration server, a licensing function to acquire a license for each publisher-share that is not covered under a preexisting license.

* * * * *